(12) United States Patent
Sugiyama et al.

(10) Patent No.: US 6,538,685 B2
(45) Date of Patent: Mar. 25, 2003

(54) MULTIPOINT VIDEO-MEETING CONTROL SYSTEM

(75) Inventors: Mikio Sugiyama, Tokyo (JP); Masaru Terashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/004,856

(22) Filed: Dec. 7, 2001

(65) Prior Publication Data

US 2002/0071027 A1 Jun. 13, 2002

(30) Foreign Application Priority Data

Dec. 8, 2000 (JP) ........................................ 2000-374071

(51) Int. Cl.[7] ................................................ H04N 7/14
(52) U.S. Cl. ................................ 348/14.09; 248/14.08; 248/14.12
(58) Field of Search ........................... 348/14.01, 14.02, 348/14.03, 14.04, 14.05, 14.07, 14.08, 14.09, 14.1, 14.11, 14.12, 14.13; 370/260; 709/204; H04N 7/14

(56) References Cited

U.S. PATENT DOCUMENTS 6,369,846 B1 * 4/2002 Katsumi .................. 348/14.09

FOREIGN PATENT DOCUMENTS

| JP | 09-168058 | 6/1997 |
| JP | 2000-083229 | 3/2000 |

* cited by examiner

*Primary Examiner*—Melur Ramakrishnaiah
(74) *Attorney, Agent, or Firm*—Young & Thompson (57) ABSTRACT

A MCU unit of a video-meeting control system includes a volume level detector for detecting volume levels of a plurality of meeting terminals, a speaker terminal selection block for selecting a speaker terminal having a maximum volume level, mixing the voice data based on volume levels detected, and a mixer for mixing the voice data based on a specified mixing level of the speaker terminal, and transmitting the video data and the mixed voice data to the meeting terminals. The specified mixing level of the speaker terminal emphasizes the volume level of the speaker terminal.

26 Claims, 11 Drawing Sheets

| TERMINAL | SPEAKER | INPUT LEVEL | MIXING RATIO | OUTPUT LEVEL |
|---|---|---|---|---|
| A | O | 60 | 50% | 60 |
| B |   | 40 | 30% | 40 |
| C |   | 30 | 20% | 30 |

1-2

| TERMINAL | SPEAKER | INPUT LEVEL | MIXING RATIO | OUTPUT LEVEL |
|---|---|---|---|---|
| A | O | 45 | 50% | 50 |
| B |   | 25 | 30% | 25 |
| C |   | 15 | 20% | 15 |

1-3

| TERMINAL | SPEAKER | INPUT LEVEL | MIXING RATIO | OUTPUT LEVEL |
|---|---|---|---|---|
| A | O | 60 | 50% | 50 |
| B |   | 25 | 30% | 25 |
| C |   | 15 | 20% | 15 |

2-1

| TERMINAL | SPEAKER | INPUT LEVEL | MIXING RATIO | OUTPUT LEVEL |
|---|---|---|---|---|
| A | O | 60 | 50% | 50 |
| B |   | 40 | 30% | 30 |
| C |   | 30 | 20% | 20 |

2-2

| TERMINAL | SPEAKER | INPUT LEVEL | MIXING RATIO | OUTPUT LEVEL |
|---|---|---|---|---|
| A | O | 60 | 50% | 50 |
| B |   | 40 | 25% | 25 |
| C |   | 10 | 25% | 10 |

2-3

| TERMINAL | SPEAKER | INPUT LEVEL | MIXING RATIO | OUTPUT LEVEL |
|---|---|---|---|---|
| A | O | 60 | 50% | 50 |
| B |   | 40 | 30% | 30 |
| C |   | 10 | 0% | 0 |

MULTIPOINT VIDEO-MEETING CONTROL SYSTEM

BACKGROUND OF THE INVENTION (a) Field of the Invention

The present invention relates to a multipoint video-meeting control system and, more particularly, to a multipoint video-meeting control system capable of smoothly switching video data and voice data without causing sense of incongruity in the switching. The present invention also relates to a method for operating such a multipoint video-meeting control system.

(b) Description of the Related Art

A multipoint video-meeting control system is known in the art which allows participants in a plurality of remote locations (local points) to have a meeting between the participants in the remote locations by using TV monitor or display units. A conventional technique for switching video data in the video-meeting control system is described in JP-A-2000-83229. The video-meeting control system generally includes a plurality of meeting terminals disposed in the remote locations, and a multipoint control unit (MCU) for controlling transmission of video data and voice data between the same and the meeting terminals.

The meeting terminal generally includes an image (video data) input/output block, a voice (voice data) input/output block, and a document data input/output block. The MCU is connected to each of the meeting terminals in the remote locations via a public communication line, thereby receiving video, voice and document data from the meeting terminals, processing these data therein and transmitting the processed data to the meeting terminals.

In the video-meeting control system, the MCU generally specifies a speaker (or speaker terminal) by detecting the voice data of a meeting terminal having a maximum volume level among all the voice data received from the meeting terminals. The MCU then transmits the video data to the other terminals received from the meeting terminal that transmits the voice data having the maximum volume level, thereby displaying the video data of the speaker on the screens of the meeting terminals.

It is difficult, however, to display without a delay the video data of a speaker that speaks for only a short time interval, because the MCU should have a marginal time between the time instant of the maximum volume detection and the time instant of switching of the video data so that the video data is not switched based on a wrong input voice such as a cough of another participant.

In addition, since the input gain of the voice input block is not uniform among the meeting terminals, the detection of the maximum volume level does not necessarily specify the speaker terminal. More specifically, for example, the voice data from a meeting terminal having a highest input gain of the voice input block may be incorrectly specified as the voice data of the speaker.

In another scheme, the MCU transmits the vide data received from the meeting terminals to display the video data in the divided area of the screen of each meeting terminal. It is expected that the participants judge the speaker on the screen by recognizing the movement of the mouth of each participant in the divided area of the screen.

In this scheme, however, it is relatively difficult for the participants to recognize the speaker on the screen because the divided areas of the screen reduce the image size of the participants in the remote locations.

In a modification of this scheme, the MCU may display an indicator on each divided area to show the volume level of the each divided area, thereby allowing the participants to easily recognize the speaker terminal based on the volume level thus displayed. In this modification, however, there still remains the problem of the reduced sizes of the speaker wherein the looks of the speaker are not received by the participants, thereby loosing the most of the merits of the video meeting.

In another scheme, an operator determines, based on the mimic voice of the speaker, which video data from the meeting terminal should be transmitted, and thereby switches the video data on the screens by hand. In this scheme, however, the switching is not achieved timely and accurately depending on the skill of the operator, especially in the case of presence of similar mimic voices in the participants.

In view of the problems in the conventional techniques, it is important for the MCU to transmit the voice data having a suitable volume level to the meeting terminals, as well as to detect the speaker and switch the video data of the speaker without a delay.

Patent Publication JP-A-9-168058 describes a technique for transmitting the voice data in a multipoint video-meeting control system, wherein the MCU transmits voice data to a meeting terminal after mixing a plurality of voice data received from the other terminals, in order for allowing the voice data to be exchanged between the plurality of terminals.

One of the video data switching techniques described before can be used in the control system described in the above publication, JP-A-9-168058, in view that it is useless to simply mix the video data from a plurality of terminals during transmission of data between the plurality of terminals. The MCU in the publication uses one of the above switching techniques wherein the video data corresponding to the maximum volume level of the meeting terminal is transmitted to all the meeting terminals.

In the described technique, the MCU normalizes the volume levels of the voice data from the meeting terminals before the MCU mixes the voice data and transmits the mixed voice data. This solves the above problem caused by the different input gains. In addition, a correct speaker can be detected to switch the video data while using the normalized volume level.

However, the improvements by the technique described in the publication, JP-A-9-168058, are not sufficient for switching the video data of the speaker at a suitable timing and for transmitting the mixed voice data having suitable mixing levels to the meeting terminals.

SUMMARY OF THE INVENTION

In view of the problems of the conventional technique, it is an object of the present invention to provide a multipoint video-meeting control system which is capable of transmitting mixed voice data having a suitable volume level to the meeting terminals and switching the video data on the screens of the meeting terminals without causing a sense of incongruity.

The present invention provides a multipoint video-meeting control system including: a plurality of meeting terminals each including a voice data input/output block for inputting/outputting voice data, a video data input/output block for inputting/outputting video data, and a local data transceiver connected to the voice data input/output block and the video data input/output block; and a multipoint control unit (MCU) including a central data transceiver, connected to each the local transceiver via a network, for transmitting/receiving voice data and video data to/from each of the meeting terminals through each the local transceiver, a speaker terminal selection block for selecting one of the meeting terminals as a speaker terminal, a voice data mixer for mixing the voice data from the meeting terminals at specified mixing ratios to generate mixed voice data, the specified mixing ratios allocating at least a predetermined mixing ratio to the voice data from the speaker terminal, the central data transceiver transmitting the video data of the speaker terminal and the mixed voice data to the meeting terminals.

The present invention also provides a method for controlling a video meeting, including the steps of: receiving voice data from a plurality of meeting terminals; selecting a speaker terminal among the meeting terminals based on volume levels of the voice data from the meeting terminals; mixing the voice data from the meeting terminals at specified mixing ratios to generate mixed voice data, the specified mixing ratios allocating at least a predetermined mixing ratio to the voice data from the speaker terminal; and transmitting the video data of the speaker terminal and the mixed voice data to the meeting terminals.

In accordance with the multipoint video-meeting control system and the method of the present invention, since a predetermined mixing ratios is allocated to the voice data from the speaker terminal, the mixed voice data transmitted to the meeting terminal has a suitable mixing level.

In a preferred embodiment of the present invention, the video data of the speaker terminal can be switched at a suitable timing without a sense of incongruity.

The above and other objects, features and advantages of the present invention will be more apparent from the following description, referring to the accompanying drawings.

PREFERRED EMBODIMENTS OF THE INVENTION

Figure 1:
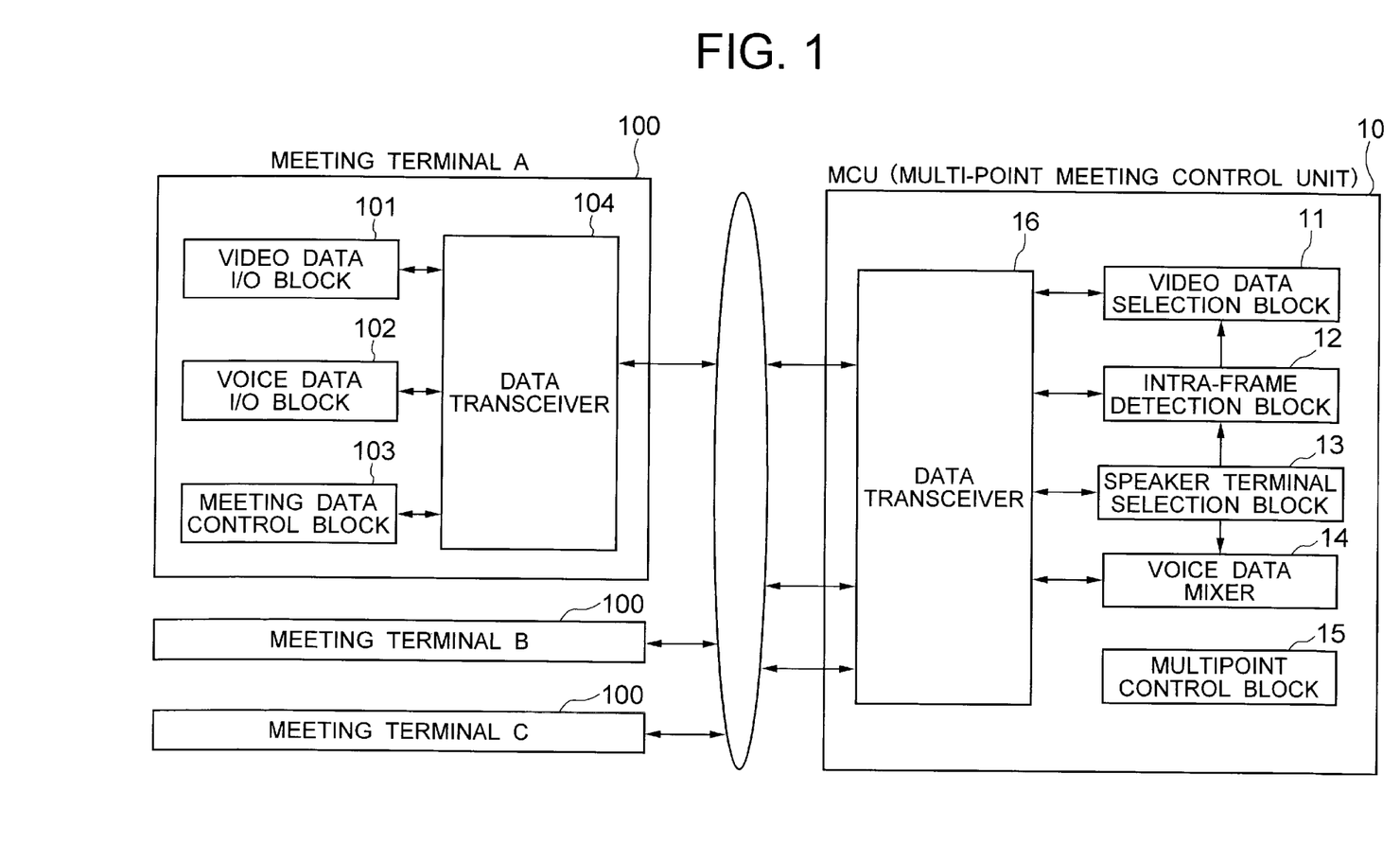
FIG. 1 is a block diagram of a multipoint video-meeting control system according to an embodiment of the present invention.

Referring to FIG. 1, a multipoint video-meeting control system according to a first embodiment of the present invention includes a multipoint control unit (MCU) 10, and a plurality of meeting terminals 100 disposed at respective remote locations and connected to the MCU 10 via a network, such as a public telephone line or the internet. In this example, three terminals (terminals A, B and C) are shown in the figure.

Each of the meeting terminals 100 is used to show the image and voice of the participants of the video meeting. The meeting terminal 100 includes a camera, a display unit (or TV monitor), a microphone, a loudspeaker, a keyboard, a mouse etc. (not shown) as hardware or the peripheral devices thereof.

The meeting terminal 100 includes, as a functional blocks thereof, a video data input/output (I/O) block 101 including the camera and the display unit, a voice data I/O block 102 including the microphone and the loudspeaker, a document data I/O block (not shown) including the keyboard and the mouse etc., a control block 103 for controlling operations in the meeting terminal 100, and a data transmission/reception block (data transceiver) 104 for transmitting/receiving data to/from the MCU 10.

The video data I/O block 101 generates video signals from the image of the participants in the video meeting by using the camera, encodes the video signals to generate video data, and transmits the video data via the data transceiver 104 to the MCU 10. The encoding of the video data by the video data I/O block 101 includes an intra-frame data predictive encoding and an inter-frame data predictive encoding, thereby achieving higher efficient encoding. The intra-frame data predictive encoding generates intra-frame data, whereas the inter-frame data predictive encoding generates inter-frame data. A combination of a single intra-frame data and a plurality of inter-frame data defines a series of video data input from the video-data input/output block 101.

The video data I/O block 101 also receives the video data of the other remote locations via the data transceiver 104 from the MCU 10, decodes the received video data, and displays the decoded video data (image) of the participants on the display unit thereof.

The voice data I/O block 102 operates for specified processing, such as A/D conversion, of the voice signals input from the microphone, encodes the voice signals to generate voice data, and transmits the voice data via the data transceiver 104 to the MCU 10.

The voice data I/O block 102 also receives the voice data, which is obtained by synthesizing or mixing the voice data of the meeting terminals in the respective locations, via the data transceiver 104 from the MCU 10, decodes the received voice data, operates for processing, such as D/A conversion, of the decoded voice data, and reproduces the voice from the loudspeaker.

The meeting data control block 103 operates for call-connection between the meeting terminal 100 and the MCU 10 before a multipoint video meeting. The control block 103 operates for controlling the data transceiver 104 to transmit the document data input by the keyboard to the MCU 10, and also to receive the document data from the MCU 10 for displaying the same on the display unit.

The data transceiver 104 operates for transmission/reception of the video data, voice data and document data between the same and the MCU 10.

The MCU 10 includes a video data selection block 11, an intra-frame data detection block 12, a speaker terminal selection block 13, a voice data mixer 14, a multipoint control section 15, and a data transceiver 16.

In operation of the MCU unit 10, the speaker terminal selection block 13 receives a plurality of voice data from the respective meeting terminals 100, detects the volume levels of the voice data, and selects a speaker terminal (which may be referred to as simply speaker) based on the volume levels of the voice data from the meeting terminals 100. The information of the selected speaker is notified to the intra-frame data detection block 12 and the voice data mixer 14.

The voice data mixer 14 determines the mixing levels of the voice data based on the detected volume levels of the voice data and the information of the selected speaker, and performs mixing of the voice data to generate mixed voice data. The intra-frame data detection block 12 detects the intra-frame data of the video data of the selected speaker, and informs the detection of the intra-frame data to the video data selection block 11. Upon receiving information of the intra-frame data detection, the video data selection block 11 switches the output video data to the video data of the selected speaker terminal. The mixed voice data generated by the voice data mixer 14 is switched based on the selected speaker and the intra-frame data detection.

Figure 2:
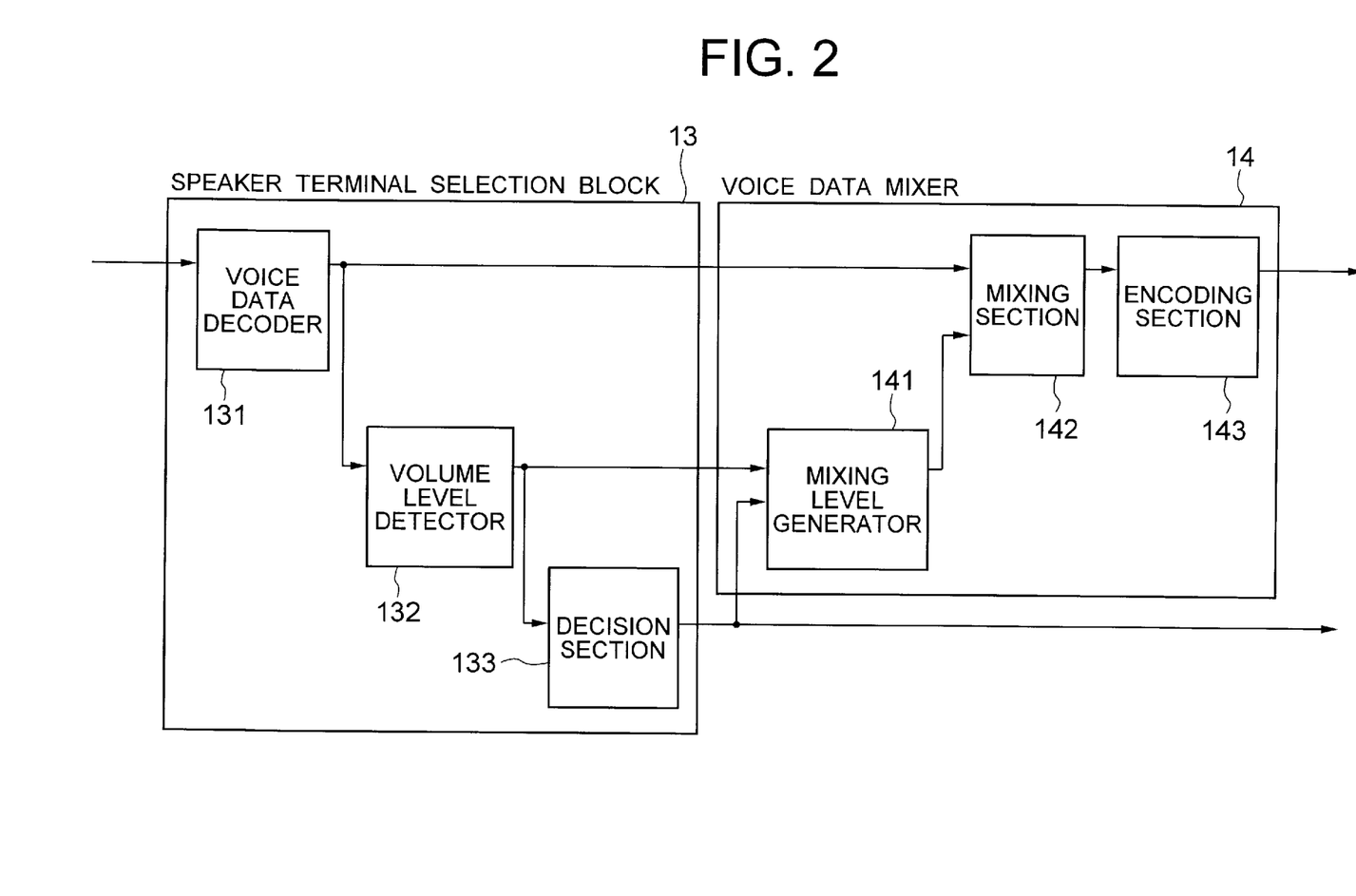
FIG. 2 is a block diagram of the speaker terminal selection block and the voice data mixer shown in FIG. 1.

Referring to FIG. 2, the speaker terminal selection block 13 includes a voice data decoder 131 for decoding the voice data, a volume level detector 132 for detecting the volume levels of the decoded voice data, and a decision section 133 for determining the speaker terminal based on the data from the volume level detector 132. The voice data mixer 14 includes a mixing level generator 141 for generating mixing levels (or mixing ratios) of the voice data based on the data from the volume level detector 132 and the information of the selected speaker supplied from the decision section 133, a mixing section 142 for mixing the decoded voice data based on the mixing levels supplied from the mixing level generator 141, and an encoding section 143 for encoding the mixed voice data supplied from the mixing section 142.

The speaker terminal selection block 13 receives via the data transceiver 16 compressed voice data, which is decoded in the voice data decoder 131 to generate decoded voice data, such as pulse code modulation (PCM) data. The decoded voice data is supplied to the volume level detector 132 and the voice data mixer 142. The mixed voice data from the voice data mixer 142 is again compressed in the voice data encoder 143.

The volume level detector 132 detects the volume levels of the voice data based on the decoded voice data, and supplies the resultant volume levels to the decision section 133 and the mixing level generator 141. The decision section 133 compares the volume levels of the voice data from the respective meeting terminals 100 against each other to determine the maximum volume level, thereby determining the speaker of the video meeting.

The mixing level generator 141 determines the mixing levels to be allocated to the voice data in the mixing of the voice data, based on the data of volume levels supplied from the volume level detector 132 and the information of the selected speaker supplied from the decision section 133. The mixing level generator 141 supplies the resultant mixing levels to the mixing section 142.

Figure 4:
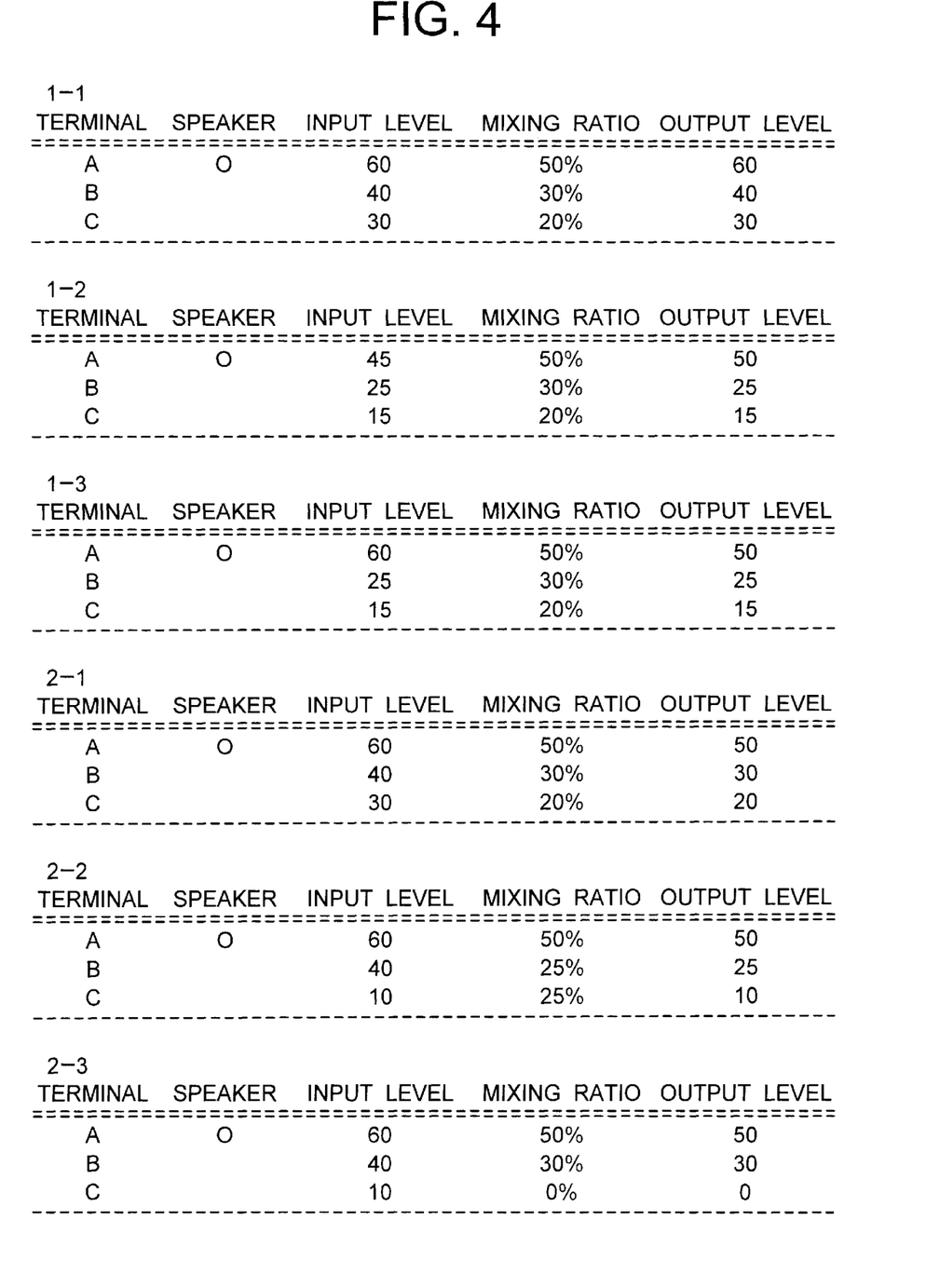
FIG. 4 shows tables of the mixing levels generated by the mixing level generator shown in FIG. 2.

Referring to FIG. 4, there are shown Tables 1-1 to 1-3 of case #1 and Table 2-1 to 2-3 of case #2, these tables showing the mixing levels or mixing ratios for mixing the voice data received from the terminals A, B and C. In these tables, the columns "input level", "mixing ratio", and "output level" mean the volume level detected by the volume level detector 132, predetermined mixing ratio which may be used during the mixing, and the volume level in the mixed voice data output from the mixing section 142. A mark on the "Speaker" column means that the meeting terminal (A in this case) having the mark is selected as the speaker. In this example, the maximum input level is assumed at 100.

In Table 1-1, the voice data are mixed together, without using the information of the selected speaker, wherein the output ratios follow the input ratios. In this case, it is noted that the input level (60) of the meeting terminal having a highest volume level is above the predetermined mixing ratio (50%).

In Table 1-2, the voice data are mixed together while raising the mixing level up to 50% for the speaker by using the predetermined mixing ratios based on the information of the selected speaker. More specifically, a predetermined mixing ratio of 50% is assigned to the speaker (terminal A) because the input level of the speaker is 45, or below 50%. The input levels are assigned to the meeting terminals B and C having second and third volume levels in magnitude, because these input levels (25, 15) are below the predetermined mixing ratios (30%, 20%).

In Table 1-3, the voice data are mixed together, with the mixing ratio of the speaker being lowered from the input level (60) to 50% because the input level exceeds the predetermined mixing level (50).

In each of these Tables 1-2 and 1-3, since the terminals B and C are not selected as the speaker, the mixing levels used here are set at the input levels although the input levels are below the predetermined input levels.

In Table 2-1, since the input levels of the meeting terminals exceed the respective predetermined mixing ratios, the mixing levels used here are lowered down to the predetermined mixing ratios. In this table, the information of the selected speaker is not used.

In Table 2-2, the predetermined mixing ratios are used for the terminals A and B, irrespective of the input levels detected. In this case, since the terminal C is not selected as the speaker, the input level (10) is used as the mixing level without using the predetermined mixing ratio (25%).

In Table 2-3, it is shown that the mixing level for the terminal C is set at "0" because the input level (10) thereof does not exceed a maximum noise level which is determined at 15 in this case. It is to be noted that the lower output level rather makes noise in the output mixed voice data.

Back to FIG. 2, the mixing section 142 mixes a plurality of decoded voice data based on the mixing levels output from the mixing level generator 141 to output a mixed voice data.

In FIG. 1, the video data selection block 11 selects one of the voice data from the meeting terminals 100 as the speaker terminal based on the information of the selected speaker supplied from the speaker terminal selection block 13. The video data selection block 11 then transmits the selected video data via the data transceiver 16 to the meeting terminals 100.

The intra-frame data detection block 12 detects compressed intra-frame data from the plurality of compressed video data of the speaker terminal, transmitting the information of intra-frame data detection to the video data selection block 11.

The video data selection block 11 switches the output video data to the video data of the selected speaker based on the information of the intra-frame data detection. The multiple control block 15 controls the operation of the MCU 10 as a whole.

Before starting a video meeting by using the multipoint video-meeting control system of the present embodiment, the meeting terminals A, B and C are call-connected to the MCU 10.

The voice data I/O block 102 of each terminal 100 performs specified processings, such as A/D conversion and encoding, of the voice data of the participants which is input from the microphone. The voice data I/O block 102 then transmits the resultant voice data via the data transceiver 103 to the MCU 10.

The voice data mixer 14 of the MCU 10 receives the voice data from the meeting terminals 100, performs mixing of the voice data and transmits the mixed voice data via the data transceiver 16 to the meeting terminals 100.

The video data I/O block 101 of each meeting terminal 100 transmits the video data obtained by the camera via the data transceiver 103 to the MCU 10.

The video data selection block 11 of the MCU 10 selects one of the video data transmitted from the respective meeting terminals 100 to transmit the selected video data to the meeting terminals 100. The video data selection block 11 may add information of the participant or participants in the selected video data to the selected video data for transmission. For example, the information may include name and/or section of the participant.

The video data I/O block 101 of each meeting terminal 100 displays on the display unit the video data received from the MCU 10. The display unit may displays thereon the information, such as the name and section of the participant, together with the video data.

Figure 5:
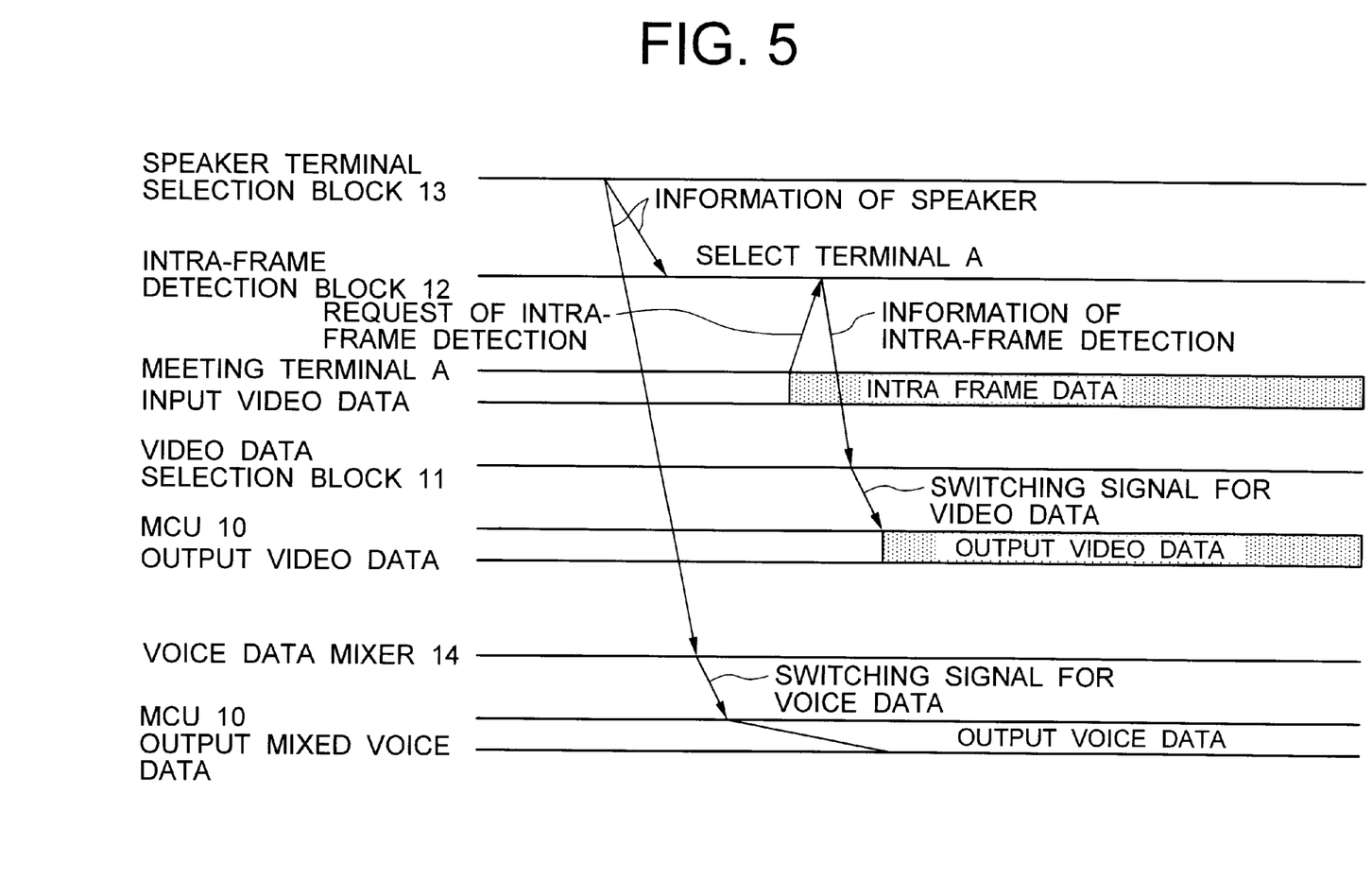
FIG. 5 is a timing chart showing the switching of the mixed voice data and the video data in the first embodiment.

Referring to FIG. 5, there is shown a timing chart for switching of the mixed voice data and the video data. The speaker terminal selection block 13 calculates the volume levels (decibel) of the voice data received from the meeting terminals 100 based on the magnitude of the voice data. The speaker terminal selection block 13 selects one of the voice data having a maximum volume level among the voice data from the meeting terminals 100, thereby selecting the speaker terminal.

Information of the selected speaker is supplied to the intra-frame data detection block 12 and the voice data mixer 14. The intra-frame data detection block 12 detects the intra-frame data from the video data of the speaker supplied from the terminal A. The intra-frame data detection block 12 supplies information of the intra-frame data detection to the video data selection block 11.

The video data selection block 11, after receiving the information of the intra-frame data detection, selects the video data supplied from the terminal A to transmit the selected video data via the data transceiver 16.

Now, switching of the output mixed voice data will be described hereinafter. The information of the selected speaker is supplied to the mixing level generator 141 and the mixing section 142. The mixing level generator 141 determines the mixing levels based on the information of the selected speaker and the input volume levels of the voice data received from the volume level detector 132.

The mixing section 142 of the voice data mixer 14 performs mixing of the decoded voice data based on the mixing levels supplied from the volume level detector 132, to output the mixed voice data to the encoding section 143.

Figure 6:
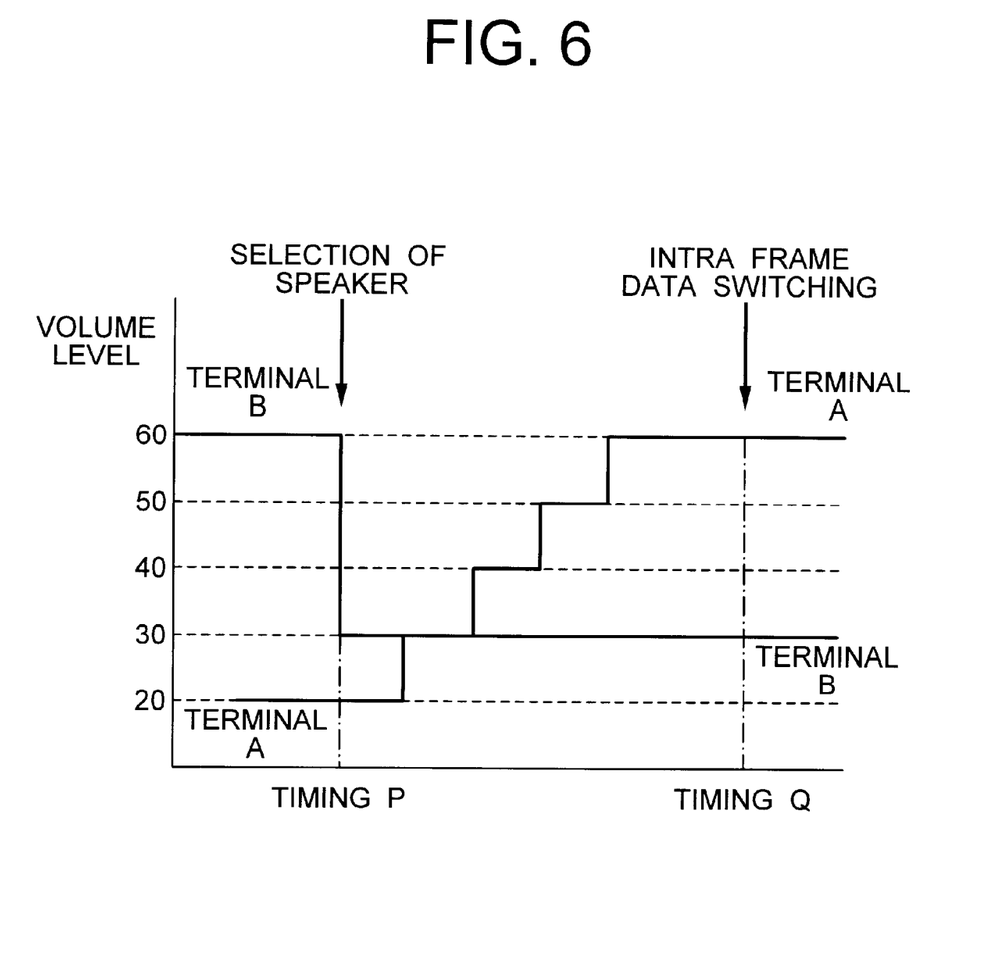
FIG. 6 is a timing chart showing the switching of the voice data in the first embodiment.

Referring to FIG. 6, an exemplified case is shown wherein the speaker is changed from the terminal B to the terminal A. It is assumed that the mixing levels of the terminals B and A are 60 and 20, respectively, in the mixed voice data before the switching and that the mixing levels of the terminals A and B are 60 and 30, respectively, in the mixed voice data after the switching. Upon receiving the information of the selected speaker that the speaker is changed from the terminal B to the terminal A at a timing P, the mixing level of the terminal B is lowered from the level 60 to the level 30 at the timing P, whereas the mixing level of the terminal A is raised stepwise from the level 20 to the level 60, as illustrated in FIG. 6.

Figure 3:
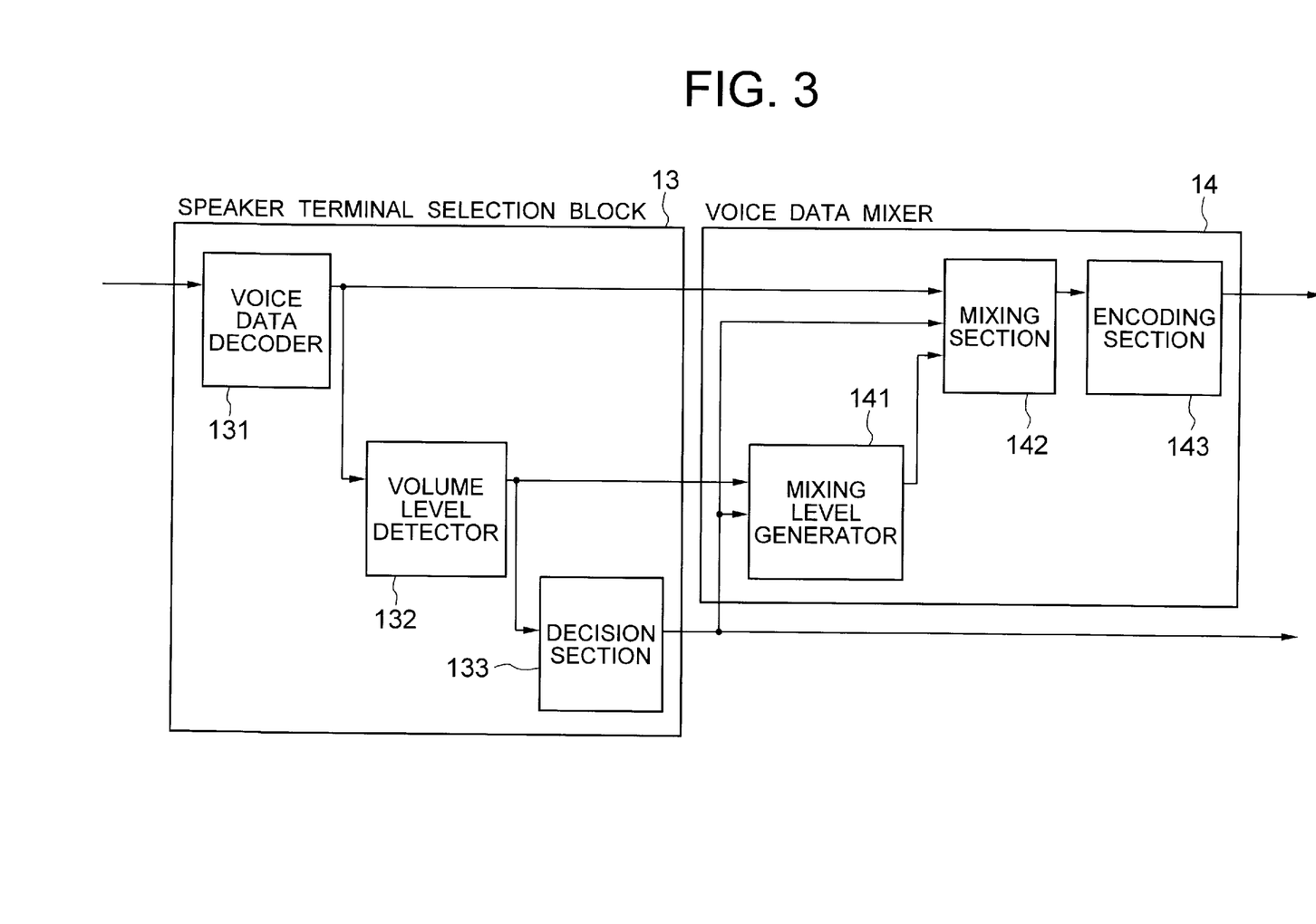
FIG. 3 is a block diagram of modifications of the speaker terminal selection block and the voice mixer shown in FIG. 2.

The stepwise switching of the terminal A is achieved by supplying the stepwise mixing level from the mixing level generator 141 to the mixing section 142. In an alternative, as shown in FIG. 3, the decision section 133 may supply the information of the speaker switching to the mixing section 142, which starts for switching the mixing level by increasing the mixing level of the speaker step by step (for example, 10 decibel in each step), which is prescribed as the normal procedure for the switching.

Figure 7:
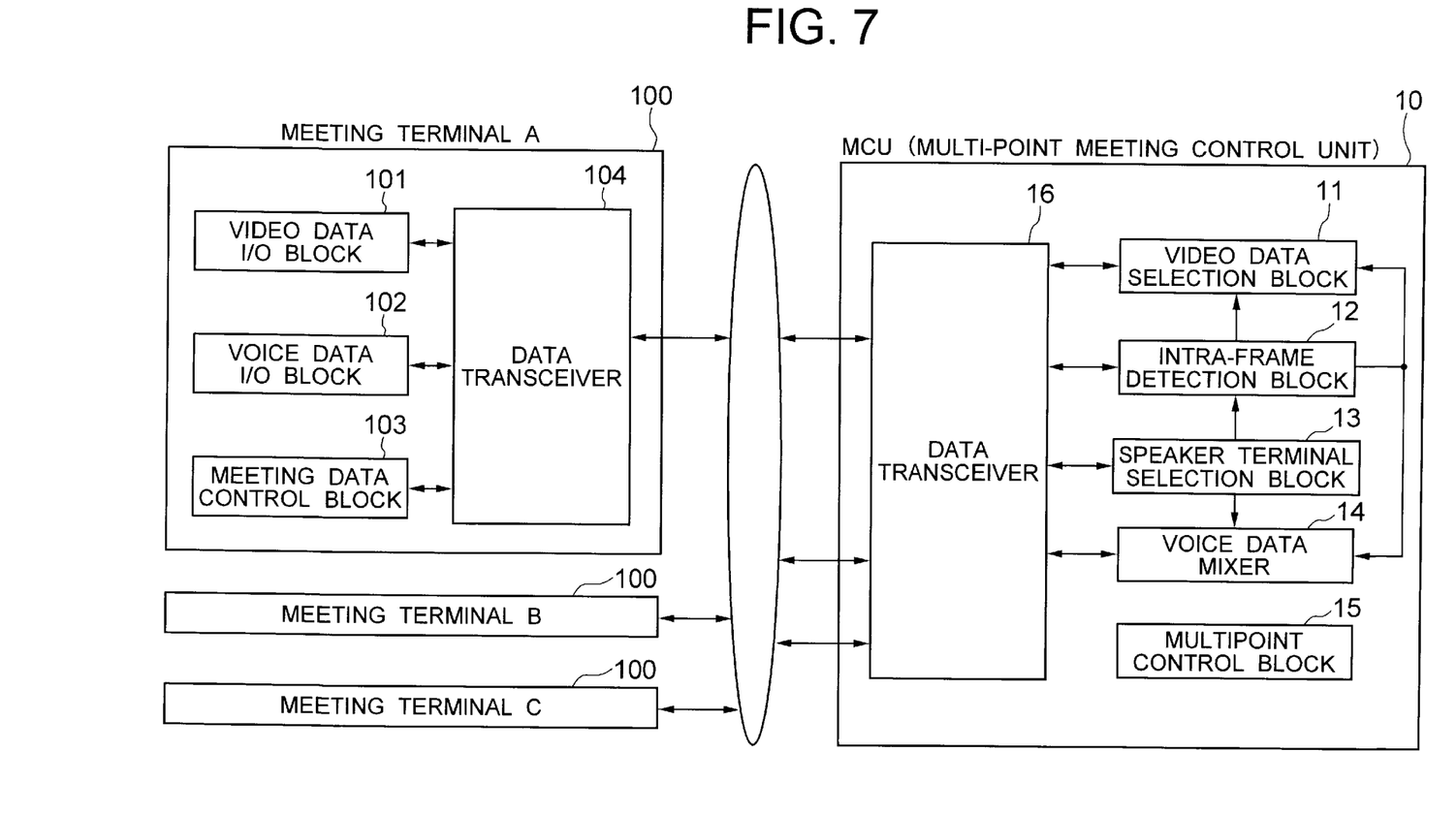
FIG. 7 is a block diagram of a multipoint video-meeting control system according to a second embodiment of the present invention.
Figure 8:
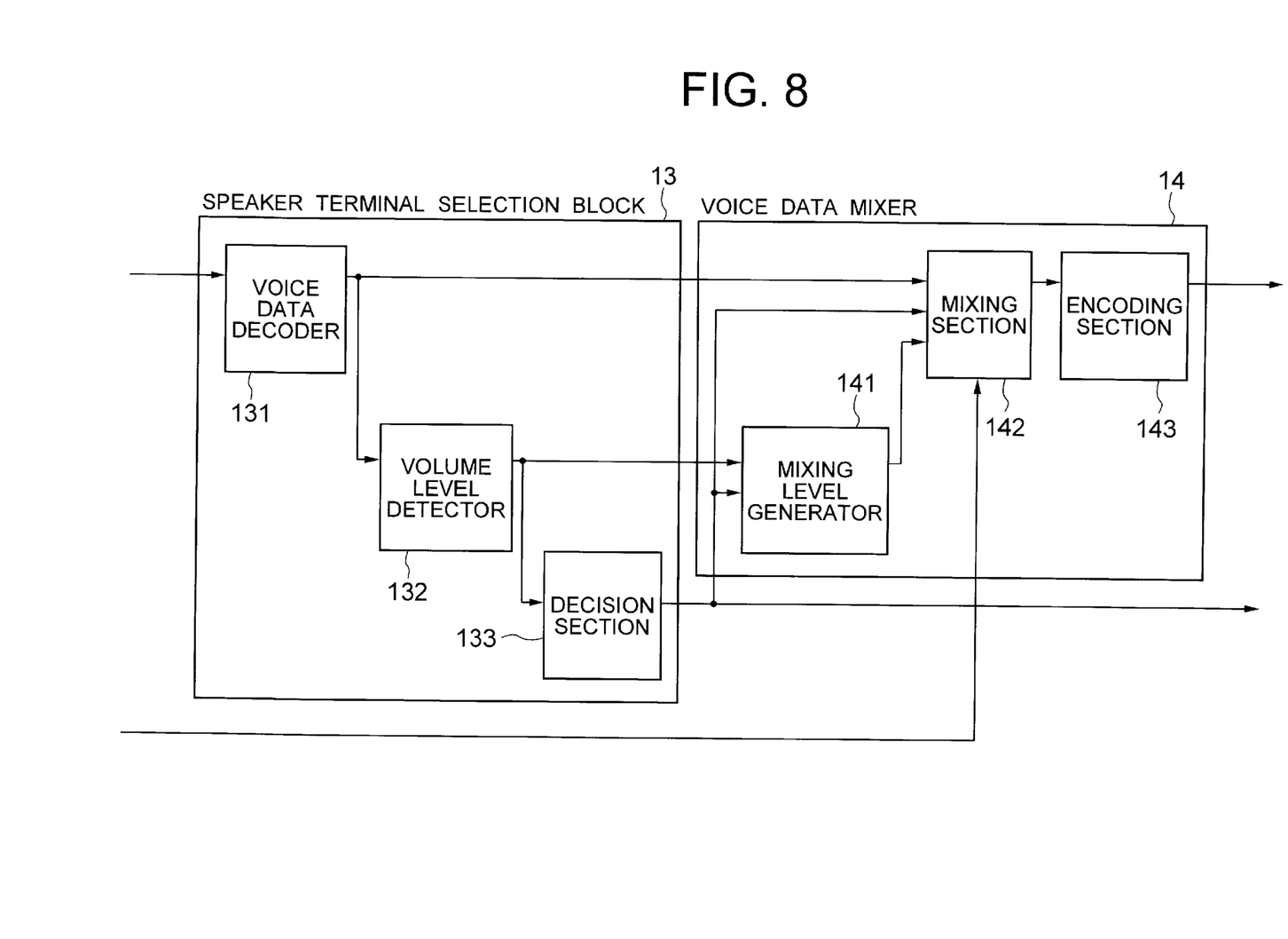
FIG. 8 is a block diagram of the speaker terminal selection block and the voice data mixer shown in FIG. 7.

Referring to FIGS. 7 and 8, a video-meeting control system according to a second embodiment of the present invention is similar to the first embodiment except that information of the intra-frame data detection is delivered from the intra-frame data detection block 12 to the mixing section of the voice data mixer 14.

Figure 9:
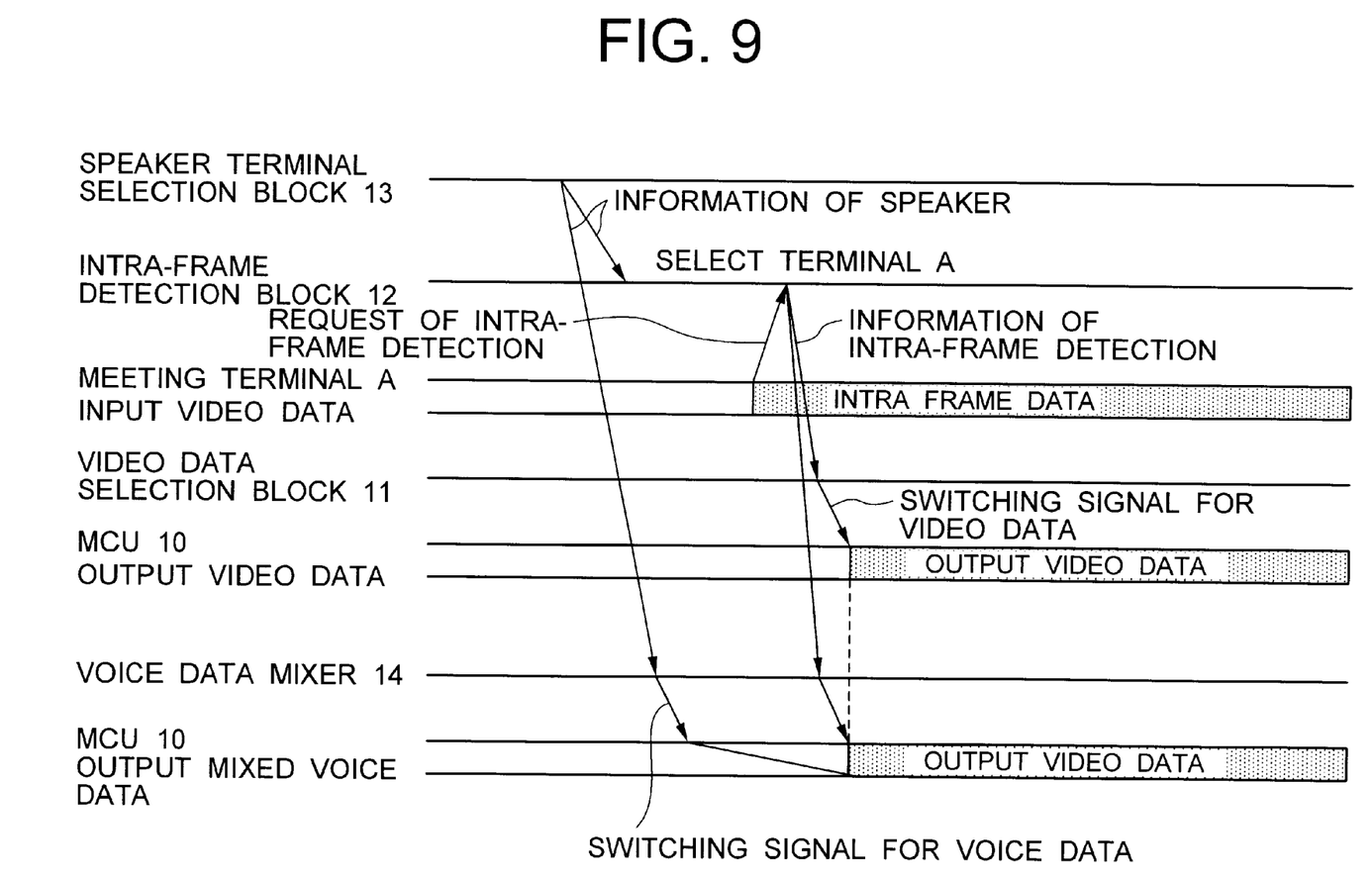
FIG. 9 is a timing chart showing the switching of the mixed voice data and the video data in the second embodiment.

Referring to FIG. 9, in the switching of the mixed voice data, the speaker terminal selection block 13 calculates the volume levels (decibel) of the voice data from the meeting terminals 100, and selects one of the voice data as the speaker among all the voice data from the meeting terminals 100. The speaker terminal selection block 13 selects the terminal A as the speaker in this example.

The information of the selected speaker is supplied to the intra-frame data detection block 12 and the voice data mixer 14. The intra-frame data detection block 12, after receiving the information of the speaker selection, detects the intra-frame data in the video data of the speaker from the terminal A. The intraframe data detection block 12 informs the intra-frame data detection to the video data selection block 11 and the voice data mixer 14.

The video data selection block 11, after receiving the information of the intra-frame data detection, switches the video data to the video data of the terminal A, transmitting the switched video data including a single intra-frame data and a plurality of subsequent inter-frame data. Thus, the display units of the meeting terminals 100 can display thereon the image of the speaker in the terminal A immediately after the switching.

The switching of the voice data is performed as follows. The information of the selected speaker is delivered from the decision section 133 to the mixing level generator 141 and the mixing section 142. The mixing level generator 141 determines the mixing levels of the voice data for the mixing based on the information of the selected speaker and the input volume levels of the meeting terminals 100.

The mixing section 142 of the voice data mixer 14 performs mixing of the decoded voice data supplied from the voice data decoder 131 based on the mixing levels supplied from the mixing level generator 132. The mixing section 142 delivers the mixed voice data to the encoding section 143 based on the information of the intra-frame data detection. In this example, the mixing section 142 delivers the voice data for the meeting terminals A selected as the speaker. The dotted line shown in FIG. 9 shows a suitable synchronization between the output video data and the output voice data. The voice data mixer 14 switches the output voice data at the timing Q upon switching the intra-frame data, and not at the timing P upon receiving information of the selected speaker.

Figure 10:
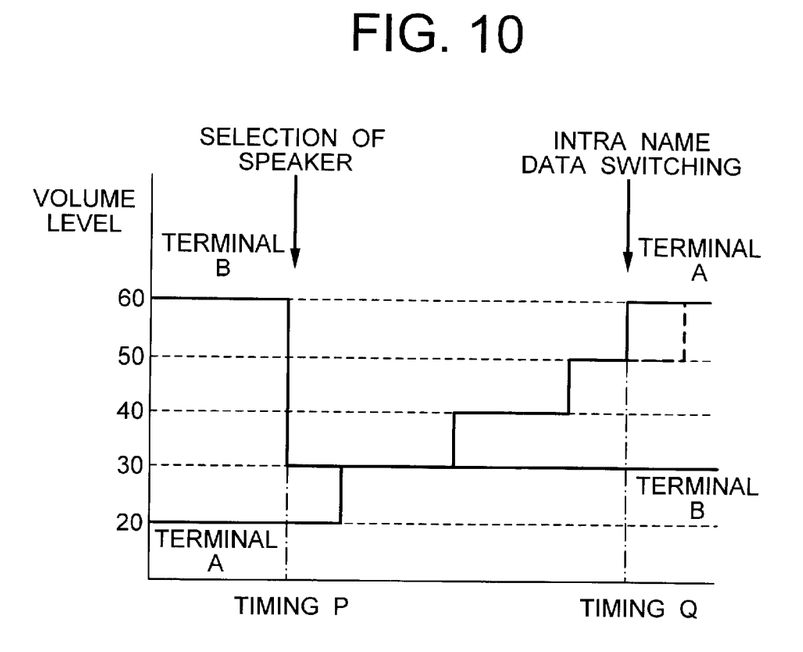
FIG. 10 is a timing chart showing the switching of the voice data in the second embodiment.

FIGS. 10 to 13 respectively show the timing of switching the mixed voice data based on the information of the selected speaker and the intra-frame data detection. In FIG. 10, the information of the selected speaker is used for the timing of start for switching of the output mixed voice data. In this example, the mixing level of the voice data of the terminal B is lowered at the timing P of the input of the information of the selected speaker, whereas the mixing level of the voice data of the terminal A is raised step by step and reaches the final level at the timing Q of the infra-frame data switching. It is to be noted that the mixing level of the voice data of the terminal A in FIG. 6 is not switched at the timing Q of the intra-frame data switching.

Figure 11:
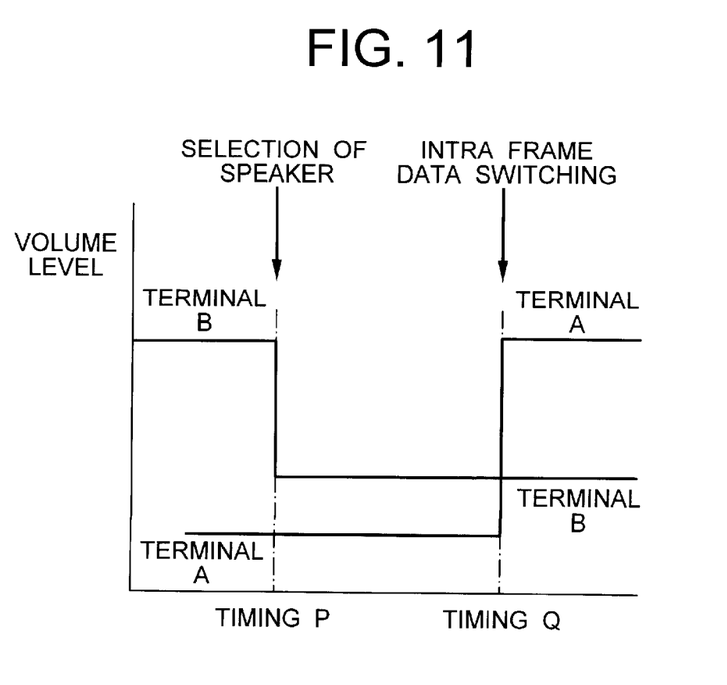
FIG. 11 is another timing chart showing the switching of the voice data in the second embodiment.

In FIG. 11, the mixing level of the voice data of the terminal B is switched at the timing P of the information of the selected speaker, whereas the mixing level of the voice of the terminal A is switched at the timing Q of the information of the intra-frame data detection. In FIG. 11, a stepwise increasing scheme is not used for the mixing level of the terminal A.

Figure 12:
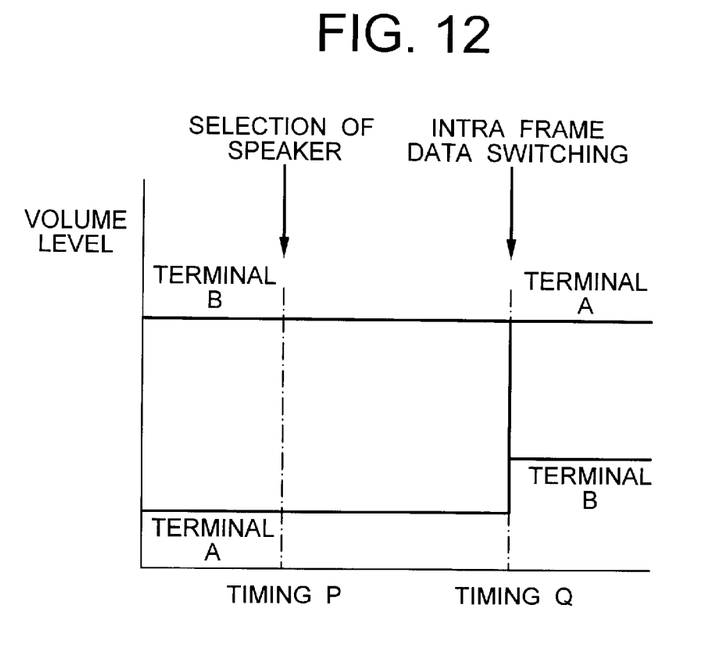
FIG. 12 is another timing chart showing the switching of the voice data in the second embodiment.
Figure 13:
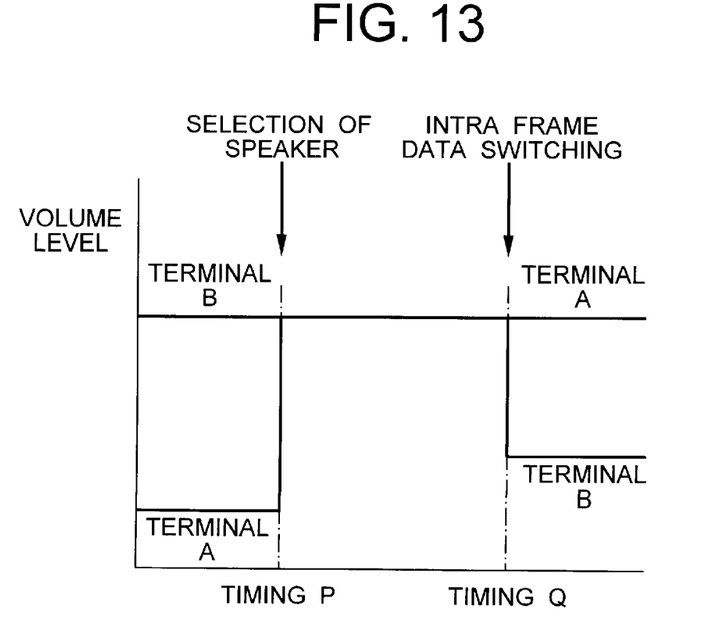
FIG. 13 is another timing char showing the switching of voice data in the second embodiment.

In FIG. 12, both the mixing levels of the voice data of the terminals A and B are switched at the timing of the information of the intra-frame data detection. In FIG. 13, the mixing level of the voice data of the terminal A is switched at the timing of the information of the selected speaker, whereas the mixing level of the voice data of the terminal B is switched at the timing of the information of the intra-frame data detection. It is to be noted that the mixing level of the voice data of the terminal A may be raised stepwise.

The switching of the mixing level of the voice data may be executed by a program. The program may be stored on an optical recording medium, magnetic recording medium, or a semiconductor memory device. In an alternative, such a program may be downloaded to the meeting terminals through the internet by using a file transfer protocol.

The present invention has the following embodiments wherein:

(1) The mixing level of the voice data from each meeting terminals is set at a specified ratio depending on the sequential order of the input level of the voice data among the meeting terminals;

(2) the mixing level of the voice data from the speaker terminal is set at a specified level or above so that the voice data of the speaker terminal is emphasized;

(3) the video data of the meeting terminal having the maximum input level is selected as the speaker terminal, and displayed on the display units of the meeting terminals;

(4) the video data of the speaker terminal is switched based on the timing of the intra-frame data switching;

(5) the mixing level of the voice data of the selected speaker terminal is increased stepwise to the specified level by the function of the mixing level generator or the mixing section;

(6) the mixing level of the voice data of the selected speaker terminal is increased starting from the timing of input of the information of the speaker terminal selection;

(7) the mixing level of the voice data of the selected speaker terminal is increased based on the intra-frame data detection;

(8) the mixing level of the voice data of the selected speaker terminal is started at the timing of the information of the speaker terminal selection and finished at the timing of the intra-frame data detection;

(9) the mixing level of the voice data of the selected speaker terminal is increased stepwise with a specified time interval; and (10) the program for operating the MCU or the meeting terminals to prosecute the above processings is downloaded from the network or a recording medium.

Since the above embodiments are described only for examples, the present invention is not limited to the above embodiments and various modifications or alterations can be easily made therefrom by those skilled in the art without departing from the scope of the present invention.

What is claimed is:

1. A multipoint video-meeting control system comprising:

a plurality of meeting terminals each including a voice data input/output block for inputting/outputting voice data, a video data input/output block for inputting/outputting video data, and a local data transceiver connected to said voice data input/output block and said video data input/output block; and a multipoint control unit (MCU) including a central data transceiver, connected to each said local transceiver via a network, for transmitting/receiving voice data and video data to/from each of said meeting terminals through each said local transceiver, a speaker terminal selection block for selecting one of said meeting terminals as a speaker terminal, a voice data mixer changing volume levels of the voice data output from said meeting terminals in accordance with a specified mixing ratio to generate mixed voice data, said voice data mixer setting a volume level of the voice data output from said speaker terminal to at least a first level when the volume level of the voice data input to said speaker terminal is below the first level, said central data transceiver transmitting the video data of said speaker terminal and said mixed voice data to said meeting terminals.

2. The multipoint video-meeting control system as defined in claim 1, wherein said speaker terminal selection block includes a volume level detector for detecting a volume level of the voice data received from each local data transceiver, and a speaker decision section for determining said speaker terminal based on the volume levels detected by said volume level detector.

3. The multipoint video-meeting control system as defined in claim 2, wherein said voice data mixer includes a mixing level generator for generating a mixing level of the voice data of each of said meeting terminals based on a sequential order of the magnitudes of the volume levels, and a mixing section for mixing said voice data based on each said mixing level, said mixing level specifying an allowable maximum mixing ratio of the voice data from each of said meeting terminals based on said sequential order of magnitude.

4. The multipoint video-meeting control system as defined in claim 1, wherein said MCU includes an intra-frame detection block for detecting an intra-frame data in the video data of said speaker terminal upon receiving information of detection of said speaker terminal from said speaker terminal selection block.

5. The multipoint video-meeting control system as defined in claim 4, wherein said MCU includes a video data selection block for switching a then output video data to the video data from said speaker terminal based on information of detection of said intra-frame data from said intra-frame detection block.

6. The multipoint video-meeting control system as defined in claim 1, wherein said speaker terminal selection block includes a decoder for decoding the voice data from said meeting terminals to generate decoded voice data, a volume level detector for detecting voltage levels of said decoded voice data from said meeting terminals, and a speaker decision section for determining said speaker terminal among said meeting terminals based on said volume levels thereof.

7. The system of claim 1, wherein said voice data mixer sets the volume level of the voice data output from said speaker terminal to a first level when the volume level of the voice data input to said speaker terminal is above the first level.

8. The system of claim 1, wherein said voice data mixer sets the volume level of the voice data output from one of said meeting terminals that is not said speaker terminal to a second level below the first level when the volume level of the voice data input to said one of said meeting terminals that is not said speaker terminal is above the second level.

9. A method for controlling a video meeting, comprising the steps of:
receiving voice data from a plurality of meeting terminals;
selecting a speaker terminal among said meeting terminals based on volume levels of said voice data from said meeting terminals;
changing volume levels of the voice data output from said meeting terminals in accordance with a specified mixing ratio to generate mixed voice data, said specified mixing ratio setting a volume level of the voice data output from said speaker terminal to at least a first level when the volume level of the voice data input to the speaker terminal is below the first level; and
transmitting video data of said speaker terminal and said mixed voice data to said meeting terminals.

10. The method as defined in claim 9, wherein said speaker selecting step includes the steps of detecting a volume level of the voice data received from each said meeting terminal, and determining said speaker terminal based on the volume levels detected.

11. The method as defined in claim 10, wherein said mixing step includes the steps of generating a mixing level of the voice data of each of said meeting terminals based on a sequential order of the magnitudes of the volume levels detected, said mixing level specifying an allowable maximum mixing ratio of the voice data from each of said meeting terminals based on said sequential order of magnitude.

12. The multipoint video-meeting control system as defined in claim 9, further comprising the steps of detecting an intra-frame data in the video data of said speaker terminal upon receiving information of detection of said speaker terminal from said speaker terminal selection block.

13. The method as defined in claim 12, further comprising the step of switching a then output video data to the video data from said speaker terminal based on information of detection of said intra-frame data from said intra-frame detection block.

14. The method as defined in claim 9, wherein said speaker terminal selecting step includes the steps of decoding the voice data from said meeting terminals to generate decoded voice data, detecting volume levels of said decoded voice data from said meeting terminals, and determining said speaker terminal among said meeting terminals based on said volume levels thereof.

15. The method of claim 9, further comprising the step of the setting the volume level of the voice data output from the speaker terminal to the first level of the voice data output level of the voice data input to the speaker terminal is above the first level.

16. The method of claim 9, further comprising the step of setting the volume level of the voice data output from one of the meeting terminals that is not the speaker terminal to a second level below the first level when the volume level of the voice data input to the one of the meeting terminals that is not the speaker terminal is above the second level.

17. A multipoint video-meeting control system comprising:
a plurality of meeting terminals each including a voice data input/output block for inputting/outputting voice data, a video data input/output block for inputting/outputting video data, and a local data transceiver connected to said voice data input/output block and said video data input/output block;
a multipoint control unit (MCU) including a central data transceiver, connected to each said local transceiver via a network, for transmitting/receiving voice data and video data to/from each of said meeting terminals through each said local transceiver, a speaker terminal selection block for selecting one of said meeting terminals as a speaker terminal, a voice data mixer for mixing the voice data from said meeting terminals at specified mixing ratios to generate mixed voice data, said specified mixing ratios allocating at least a predetermined mixing ratio to the voice data from said speaker terminal, said central data transceiver transmitting the video data of said speaker terminal and said mixed voice data to said meeting terminals;
wherein said speaker terminal selection block includes a decoder for decoding the voice data from said meeting terminals to generate decoded voice data, a volume level detector for detecting voltage levels of said decoded voice data from said meeting terminals, and a speaker decision section for determining said speaker terminal among said meeting terminals based on said volume levels thereof, and
wherein said voice data mixer includes a mixing level generator for generating mixing levels of the voice data from said meeting terminals based on said volume levels and information of said speaker terminal, a mixing section for mixing said decoded voice data based on mixing levels generated by said mixing level generator to generate mixed voice data, and an encoding section for encoding said mixed voice data.

18. The multipoint video-meeting system as defined in claim 17, wherein said mixing level generator generates a stepwise mixing level for said speaker terminal upon selection thereof.

19. The multipoint video-meeting system as defined in claim 17, wherein said mixing section increases mixing ratio for said speaker terminal upon selection thereof.

20. The multipoint video-meeting system as defined in claim 17, wherein said MCU includes an intra-frame data detection block for detecting an intra-frame data of said speaker terminal, and a video data selection block for switching a then output video data to the video data of said speaker terminal based on information of detection of said intra-frame data by said intra-frame data detection block.

21. The multipoint video-meeting system as defined in claim 20, wherein said mixing section starts for increasing the mixing ratio for said speaker terminal upon selection thereof, and finishes for increasing said mixing ratio at a timing of switching by said video data selection block.

22. A method for controlling a video meeting, comprising the steps of:

receiving voice data from a plurality of meeting terminals;

selecting a speaker terminal among said meeting terminals based on volume levels of said voice data from said meeting terminals;

mixing the voice data from said meeting terminals at specified mixing ratios to generate mixed voice data, said specified mixing ratios allocating at least a predetermined mixing ratio to the voice data from said speaker terminal; and transmitting the video data of said speaker terminal and said mixed voice data to said meeting terminals;

wherein said speaker terminal selecting step includes the steps of decoding the voice data from said meeting terminals to generate decoded voice data, detecting volume levels of said decoded voice data from said meeting terminals, and determining said speaker terminal among said meeting terminals based on said volume levels thereof, and wherein said mixing step includes the step of generating mixing levels of the voice data from said meeting terminals based on said volume levels and information of said speaker terminal, said mixing levels specifying said mixing ratios during said mixing, and encoding said mixed voice data.

23. The method as defined in claim 22, wherein said mixing level generating step generates a stepwise mixing level for said speaker terminal upon selection thereof.

24. The method as defined in claim 23, wherein said mixing ratio for said speaker terminal increases upon selection of said speaker terminal.

25. The method as defined in claim 23, wherein said video data selecting step includes the step of detecting an intra-frame data of said speaker terminal, and a switching a then output video data to the video data of said speaker terminal based on information of detection of said intra-frame data.

26. The method as defined in claim 25, wherein said mixing step starts for increasing the mixing ratio for said speaker terminal upon selection thereof, and finishes for increasing said mixing ratio at a timing of switching of said video data.

* * * * *